(12) United States Patent
Ennis

(10) Patent No.: US 8,120,651 B2
(45) Date of Patent: Feb. 21, 2012

(54) VIDEO CAPTURE ASSEMBLY

(75) Inventor: Timothy James Ennis, Seattle, WA (US)

(73) Assignee: Motocam 360, L.L.C., Bothell, WA (US)

( * ) Notice: Subject to any disclaimer, the term of this patent is extended or adjusted under 35 U.S.C. 154(b) by 1147 days.

(21) Appl. No.: 11/932,919

(22) Filed: Oct. 31, 2007

(65) Prior Publication Data
US 2009/0109286 A1    Apr. 30, 2009

(51) Int. Cl.
H04N 7/18    (2006.01)

(52) U.S. Cl. ............................. 348/81; 348/61; 348/169

(58) Field of Classification Search .................... 348/61, 348/81, 169
See application file for complete search history.

(56) References Cited

U.S. PATENT DOCUMENTS

| 4,453,937 | A | * | 6/1984 | Kurtz et al. | 604/319 |
| 6,016,160 | A | * | 1/2000 | Coombs et al. | 348/61 |
| 6,108,437 | A | * | 8/2000 | Lin | 382/118 |
| 6,292,213 | B1 | * | 9/2001 | Jones | 348/61 |
| 7,528,881 | B2 | * | 5/2009 | Ahiska | 348/335 |
| 7,576,800 | B2 | * | 8/2009 | Swain | 348/376 |
| 2004/0119816 | A1 | * | 6/2004 | Swain | 348/61 |
| 2005/0210120 | A1 | * | 9/2005 | Yukie et al. | 709/217 |
| 2006/0072007 | A1 | * | 4/2006 | Gilor | 348/61 |
| 2007/0022520 | A1 | * | 2/2007 | Grassl et al. | 2/424 |
| 2007/0097212 | A1 | * | 5/2007 | Farneman | 348/143 |

OTHER PUBLICATIONS

U.S. Appl. No. 11/932,883 Timothy James Ennis (filed Oct. 31, 2007).
"Neoprene Cap—Helmet Camera," Helmet Camera, http://www.helmetcamera.com/hcimages/NeopreneCap_400.jpg, downloaded 2007, 1 page.
"Surveillance Products > I.V.A.C.S 360," Aventura Technologies, http://www.aventuratechnologies.com/products/product_detail.asp?clProdID=275, 2007, 3 pages.
"TacEye Display Military Applications," Vuzix, http://www.vuzix.com/tactical/taceye_display_military_applications.html, downloaded 2007, 1 page.

* cited by examiner

Primary Examiner — Liangche A Wang
(74) Attorney, Agent, or Firm — Woodcock Washburn LLP

(57) ABSTRACT

A video capture assembly is provided with a video recording device disposed inside a protective case. A device interface inside the case is coupled to a video input connector that protrudes outside said case. An image sensor is coupled via a flexible cable to the video input connector.

24 Claims, 8 Drawing Sheets

VIDEO CAPTURE ASSEMBLY

BACKGROUND

Personal video capture is making exciting advances as the size of cameras shrinks, the cost of electronic recording comes within reach of the average consumer, and the ease of digitally archiving and sharing video improves.

Enthusiasts in a variety of endeavors ranging from car and bike racing to skydiving, paintball, skiing and snowboarding can now capture their experiences on video. However, the quality of user experience is a function of device portability, durability, and product safety as well as premium quality video capture, storage, ease of use and availability of state-of-the-art integrated technological features.

The right combination of features has proven elusive to companies offering video capture devices in today's marketplace. Adding superfluous features to a personal video capture assembly only increases complexity and degrades user experience. Appropriate features, on the other hand, greatly enhance user experience, and can lead to widespread adoption of both the video capture technology as well as revitalize interest in activities for which the video capture assembly is adapted.

A personal video capture assembly is desired that integrates an appropriate set of technological features to enhance user experience in video capture for a range of activities of interest.

SUMMARY

In consideration of the above-identified shortcomings of the art, the present invention provides a video capture assembly adapted for optimal user experience. In one exemplary embodiment, the video capture assembly comprises a waterproof protective case small enough to fit in one hand, with a shock absorbent padding disposed inside. A submersible video input connector protrudes outside said case from and is coupled to a device interface disposed inside said case. A video storage device can be placed on said shock absorbent padding and is removably attachable to said device interface. A case lid closes over the video storage device, such that motion of said video storage device relative to said case is prevented.

An image sensor can be coupled to said video input connector. The image sensor may be adapted as necessary for optimal integration with a particular activity. In one embodiment, for example, the image sensor may be deployed in a helmet camera. The helmet camera may comprise, for example, a protective housing that can be secured atop a helmet, and one or more image sensors disposed in the protective housing. A flexible cable can emerge from the helmet camera protective housing, and can carry image signals from the image sensor(s) to the video storage device. A variety of attaching means may be used to secure the protective housing atop a helmet or other host, such as the roof of a car, as will be appreciated. The protective housing may also be equipped with a complimentary equipment cavity for inclusion of additional advantageous equipment, as may be included to suit individual circumstances.

Further exemplary embodiments may include, for example, a protective case with shock absorbent padding and video input connector coupled to a device interface, a video storage device removably attachable to said device interface, where the video storage device is configured to implement certain advantageous features as described herein. For example, the video storage device may be configured to overlay data acquired via a data acquisition channel onto simultaneously received video input. The video storage device may alternatively or additionally be configured to store simultaneously received video input in a split screen format. Other advantages and features of the invention are described below.

BRIEF DESCRIPTION OF THE DRAWINGS

The systems and methods provided in connection with the video capture assembly provided herein further described with reference to the accompanying drawings in which.

DETAILED DESCRIPTION

Certain specific details are set forth in the following description and figures to provide a thorough understanding of various embodiments of the invention. Certain well-known details often associated with product manufacturing and/or electronic video capture technology are not set forth in the following disclosure, however, to avoid unnecessarily obscuring the various embodiments of the invention. Further, those of ordinary skill in the relevant art will understand that they can practice other embodiments of the invention without one or more of the details described below.

Figure 1:
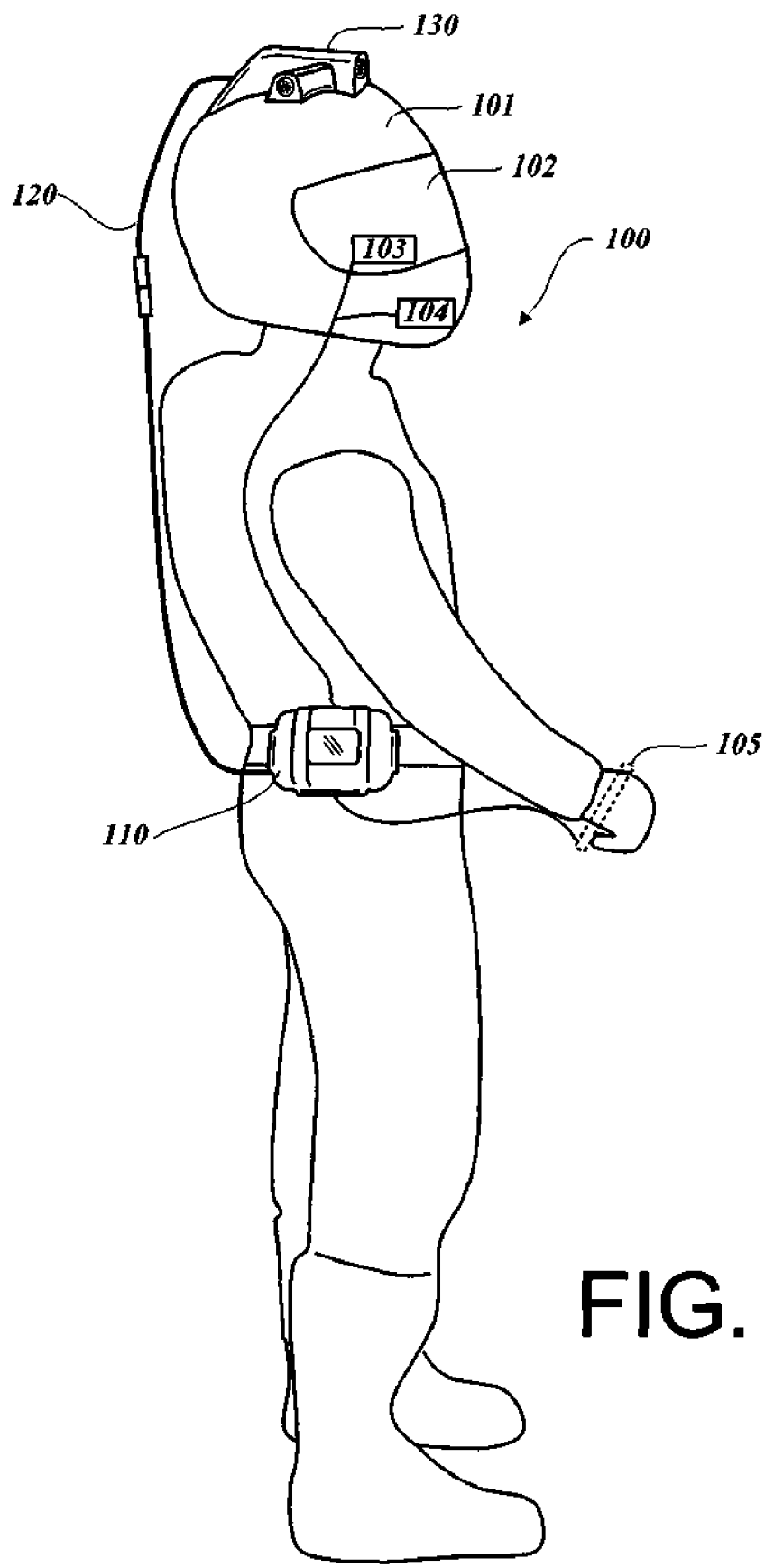
FIG. 1 illustrates a person using an exemplary video capture assembly.

FIG. 1 illustrates a person 100 using an exemplary video capture assembly. The person 100 is wearing a helmet 101 with a visor 102. In the illustrated embodiment, the video capture assembly comprises image sensor(s) deployed in a helmet camera 130, a flexible cable 120 coupled to the image sensor(s), and a video storage device disposed within a protective case 110.

Helmet camera 130 may provide a single image sensor camera, or a multidirectional helmet camera as described in detail in U.S. patent application Ser. No. 11/932,883 which is incorporated by reference for all of its teachings and embodiments. This and the various other aspects of FIG. 1 are described in greater detail below.

The video storage device in case 110 may be coupled to any of a variety of input or output devices, as is described in greater detail below. FIG. 1 illustrates a Heads Up Display (HUD) 103 integrated with the visor 102. The HUD 103 can provide for example a real time display from a rear (south) facing image sensor integrated with helmet camera 130. The HUD 103 is thus an example of an output device coupled to a video recording device disposed in the case 110. In one embodiment, the HUD may be, for example, a TACEYE® display made by Vuzix Corporation of Rochester, N.Y.

Exemplary input devices illustrated in FIG. 1 are the microphone 104 and user control device 105. The microphone 104 can receive audio signals and, for example, relay them to the video recording device disposed in the case 110 for recording along with captured video. The audio signal may also be relayed, e.g., by communications apparatus integrated in case 110 to one or more other wearers of a video capture assembly, for example providing communications for members of a police, military, or firefighting team.

The user control device 105 may, in one embodiment, comprise a grip switch that allows the person 100 to start and stop recording by the recording device. It will be appreciated that user control device 105 could be replaced with any number of other input devices that provide control information and/or other data to the video recording device. For example, device 105 could be a bite switch, a monitoring device such as a heart rate monitor, a vehicle computer, or a sensor on a firearm that detects when shots are fired.

Figure 2:
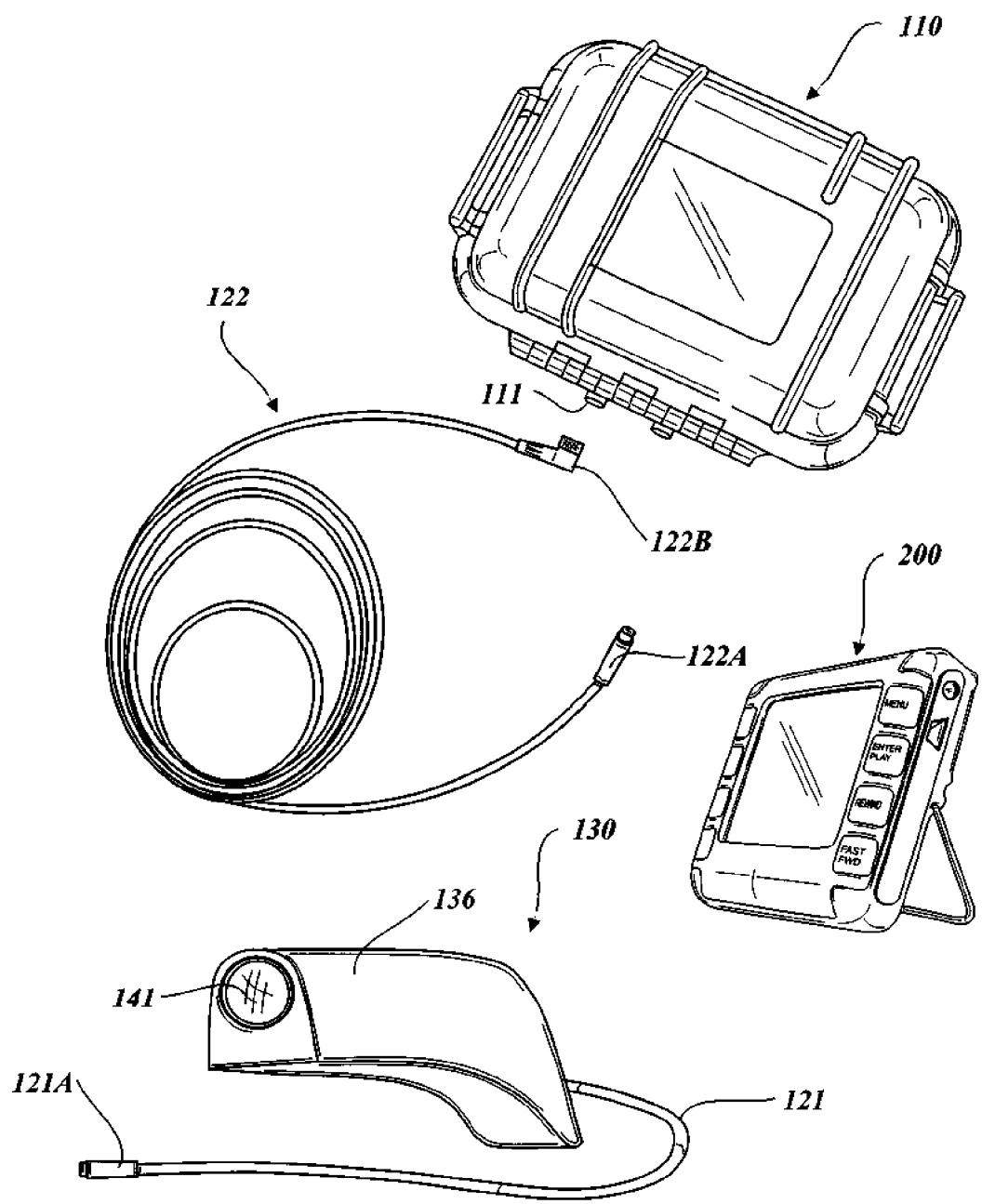
FIG. 2 illustrates various exemplary components of a video capture assembly.

FIG. 2 illustrates various exemplary components of a video capture assembly in greater detail. In one embodiment, the components of FIG. 2 may be advantageously combined in a single kit for optimal convenience. The illustrated components comprise a protective case 110 with cable interface 111. A flexible cable 122 is provided with case interface 122B and tension quick-release interface 122A. An electronic video storage device 200 fits inside the case 110, and couples to a device interface disposed inside said case 110.

An image sensor 141 is further provided. Coupled to the image sensor 141 is a flexible cable 121 with tension quick-release interface 121A that couples to the corresponding tension quick-release interface 122A on cable 122. In the illustrated embodiment, the image sensor 141 is disposed inside a protective housing 136. The image sensor 141 and protective housing 136 are illustrated in a helmet camera 130 embodiment, although the image sensor 141 may be disposed in any type of housing as necessary to suit a desired range of activities.

A variety of other items may optionally be included in an exemplary kit including the components of FIG. 2. For example, instructions for attaching the helmet camera to a helmet, and instructions for using the video storage device 200 may be included. One or more power cords for charging a battery included with the video storage device 200 may also be included, for example, a cord with USB interface that plugs into device 200, the opposite end plugging into computer USB port, standard United States, European, or international style wall socket, and/or car charger. In embodiments where video storage device 200 interfaces with a vehicle, firearm, or remote user controls, appropriate user control device and cabling and/or cable for interfacing to a vehicle computer system may further be included. Cables for output of data from device 200 to a display such as a HUD or television or to another storage or replay device such as a computer may also be provided. Finally, in some embodiments, an exemplary kit may further include additional batteries and/or memory cards for use with the video storage device 200.

Figure 3:
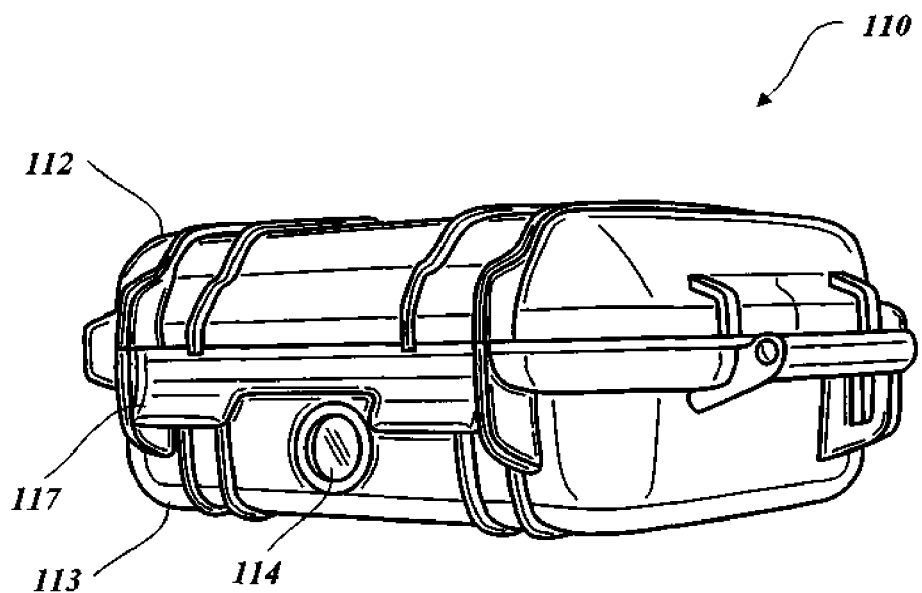
FIG. 3 illustrates an exemplary protective case for use in conjunction with the video capture assembly provided herein.
Figure 4:
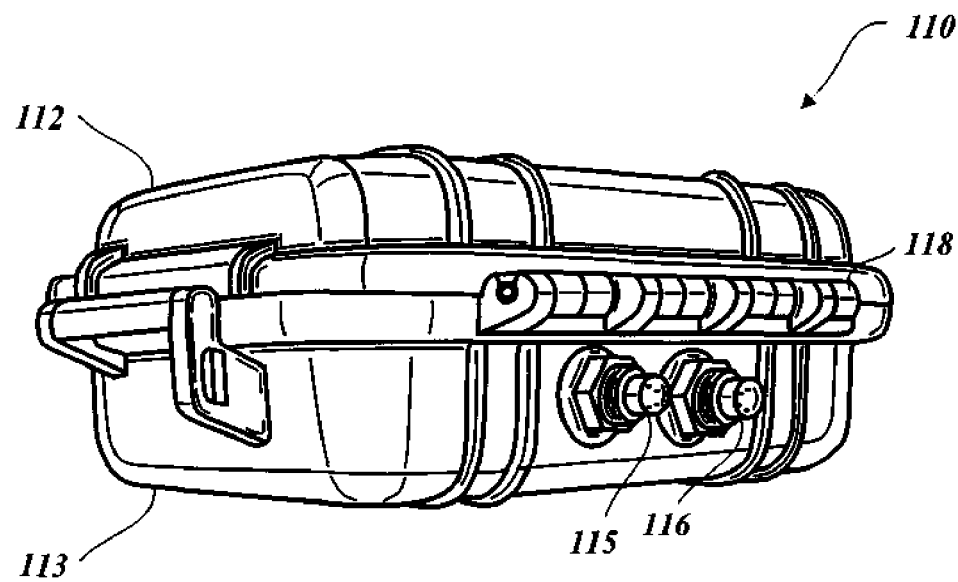
FIG. 4 illustrates another view of an exemplary protective case for use in conjunction with the video capture assembly provided herein.

FIGS. 3-4 illustrate exterior views of an exemplary protective case 110 for use in conjunction with the video capture assembly provided herein. In the illustrated embodiment, the case 110 is about five inches long, and can fit in one adult hand. This approximate dimension is useful for a wide range of activities, because it is easily portable and fits a device of relatively good battery life and functionality. However, it will be appreciated that other dimensions may also be advantageous in certain embodiments, depending on the power and number of features of the device that is desired to be placed inside the case 110, versus portability considerations.

Case 110 can be made of durable, lightweight material such as plastic or metal. In one embodiment, case 110 may made of hard, clear plastic, and watertight when closed, so that when electronic device 200 is placed inside the case 110, the case 110 and device 200 may be submerged in liquid without damage to device 200.

Waterproof protective case 110 may comprise a bottom portion 113 and a lid 112. In one embodiment, case may be a PELICAN® case, for example a clear plastic 1010 Micro Case as manufactured in 2007 by Pelican Products, Inc. of Torrance, Calif. Clear plastic provides the advantage of being able to view a device disposed inside the case 110, allowing for easy determination of device condition including whether the device remains appropriately coupled to a device interface inside the case, whether there is any damage to the device, whether water, dirt or snow has been introduced to the interior, and so forth.

FIG. 3 illustrates a hinged locking mechanism 117 on lid 112 that engages the bottom portion 113 to secure the lid 112 in a closed condition. Any of a variety of other mechanisms might alternatively be used, including, e.g., a strap for synching the case lid shut, an engageable and releasable lever system, a magnetized system, and so forth.

Also illustrated in FIG. 3 is a pressure release valve 114 in said case 110. Pressure release valve 114 is advantageous for a variety of applications in which pressure changes, for example underwater activities such as snorkeling or SCUBA, airborne activities such as flying in planes, blimps, hot air balloons, hang gliders, paragliders, or any other type of aircraft, mountaineering, and so forth. In one embodiment, pressure release valve provides a waterproof pressure equalization function, by releasing air from inside the case 110 without allowing water into the case 110.

Figure 8:
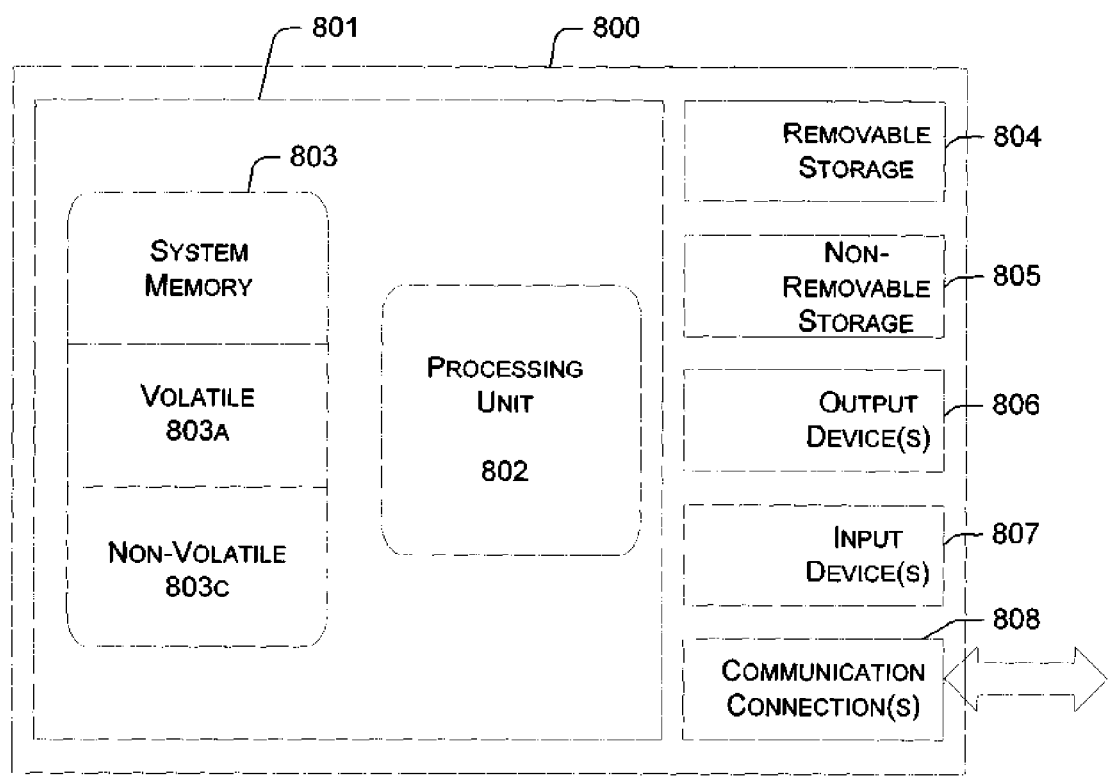
FIG. 8 illustrates a schematic diagram of an exemplary video recording device.

FIG. 4 illustrates a rear view of the case 110 comprising lid 112 and bottom portion 113. FIG. 8 shows a hinge 118 apparatus attaching the rear of lid 112 to bottom portion 113. Hinge 118 and locking mechanism 117 operate together, in this embodiment, for closing said lid 112 over said bottom portion 113 to form a watertight seal.

Also illustrated in FIG. 4 are connectors 115 and 116. In one embodiment, connector 115 is a submersible video input connector 115 and connector 116 is a submersible audio input connector. Connectors 115 and 116 may comprise, for example, IP 67 and IP 68 type connectors. Connectors 115 and 116 protrude outside the bottom portion 113 of case 110. These connectors 115 and 116 are coupled to a device interface inside the case 110 as will be described in greater detail below.

In another embodiment, one of connectors 115 or 116 may be used to interface to another type of input, for example a data input providing data from a dive computer, vehicle computer, user controls, and so forth. In a still further embodiment, one of connectors 115 or 116 may provide a video signal output to another device, such as a Heads Up Display (HUD) or a vehicle navigation display as provided in many vehicles today.

Figure 5:
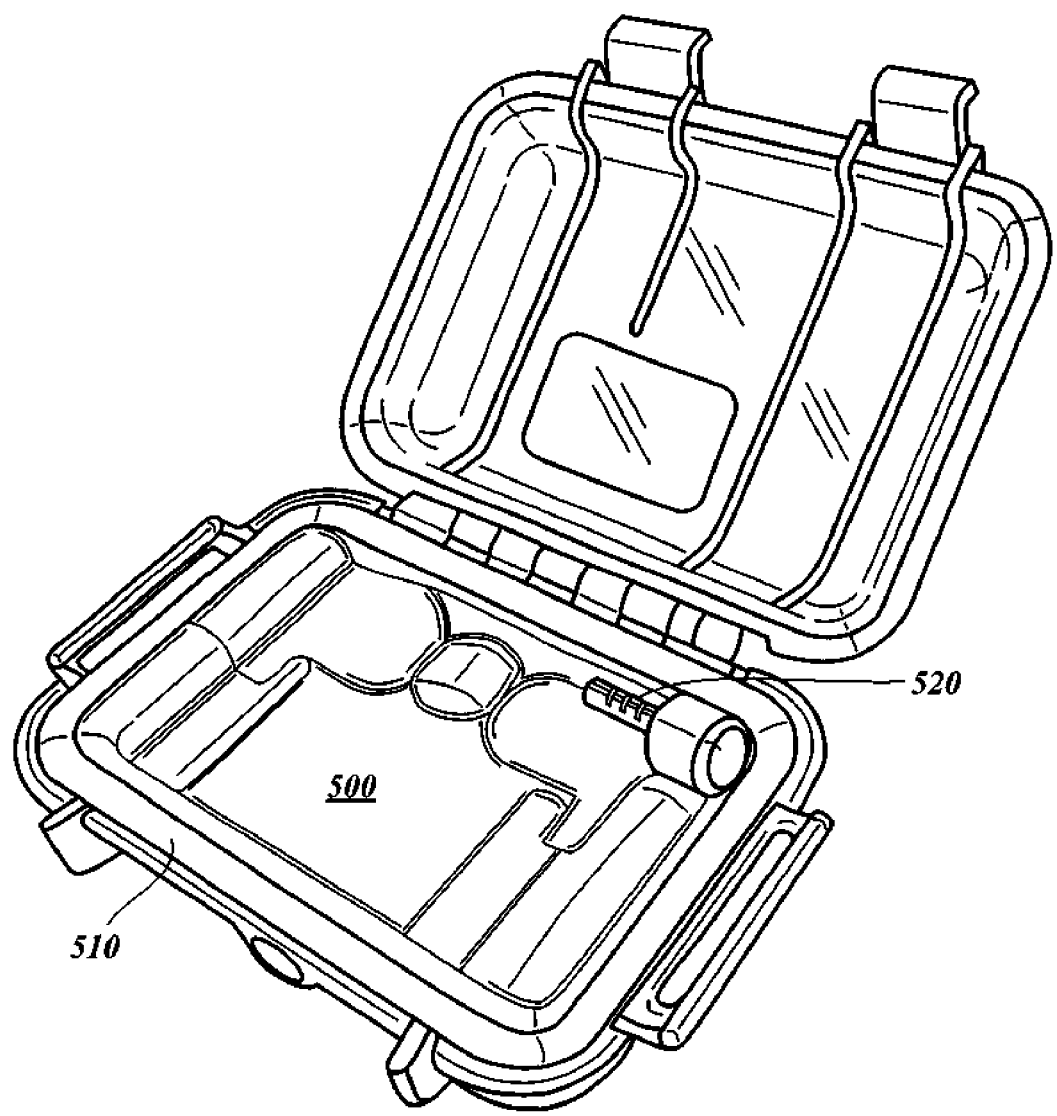
FIG. 5 illustrates an exemplary protective case interior for use in conjunction with the video capture assembly provided herein.

FIG. 5 illustrates an exemplary protective case 110 interior for use in conjunction with the video capture assembly provided herein. A shock absorbent padding 500 is disposed in the bottom portion of the case 110. The shock absorbent padding 500 may also be disposed in the lid, or around the sidewalls of the case 110. The shock absorbent padding 500 may be made, for example, from a semi-stiff foam material. While a wide range of materials may be used, a material that is stiff enough to enhance the structural integrity of the case 110, while still providing some vibration and shock absorption is preferred. Shock absorbent padding 500 may be advantageously contoured to fit the exact mold of the back of a video capture device, as illustrated. Shock absorbent padding 500 may also have bulging side portions, as illustrated, that help prevent the video capture device from any lateral motion inside the case 110.

The case interior may further comprise a waterproof layer 510. Waterproof layer 510 may be a layer of rubber or other waterproof material formed on the bottom portion of the case 110. In one embodiment, waterproof layer 510 may be positioned between an outer wall of the case 110 and the shock absorbent padding 500. Waterproof layer 510 may thus provide additional security from water intrusion into the case 110.

In one embodiment, waterproof layer 510 aids in forming a water-tight seal between the case lid and bottom portion. In such an embodiment, at least a portion of the case lid closes against and engages with the waterproof layer 510, depressing the layer somewhat and thereby forming a water-tight seal.

A device interface 520 is disposed inside the case 110. In the illustrated embodiment, interface 520 extends above the shock absorbent padding 500 as shown. The location of the device interface 520 within the case 110 is precisely chosen to accommodate attaching and removing the video storage device from said interface 520. That is, in the illustrated embodiment, the video storage device contemplated for use with the case 110 has an interface insertion point on the top right corner, such that when the device is placed face up on the shock absorbent padding 500, the device interface insertion point is the exact height off the absorbent padding 500 as the device interface 520. Device interface 520 is preferably fixed in this position to facilitate easy device attaching and removing.

Device interface 520 may be any of a wide variety of industry standard and/or proprietary interface types as are known in the electronic device arts. Device interface 520 is coupled to the connectors 115 and 116 underneath the shock absorbent padding 500—that is, in FIG. 5, shock absorbent padding 500 covers the connectors 115 and 116 as well as the coupling of device interface to connectors 115 and 116 within the case 110. This allows a video storage device to receive inputs from and/or send outputs to the image sensors, microphones, user controls, and other input/output devices as described herein.

Figure 6:
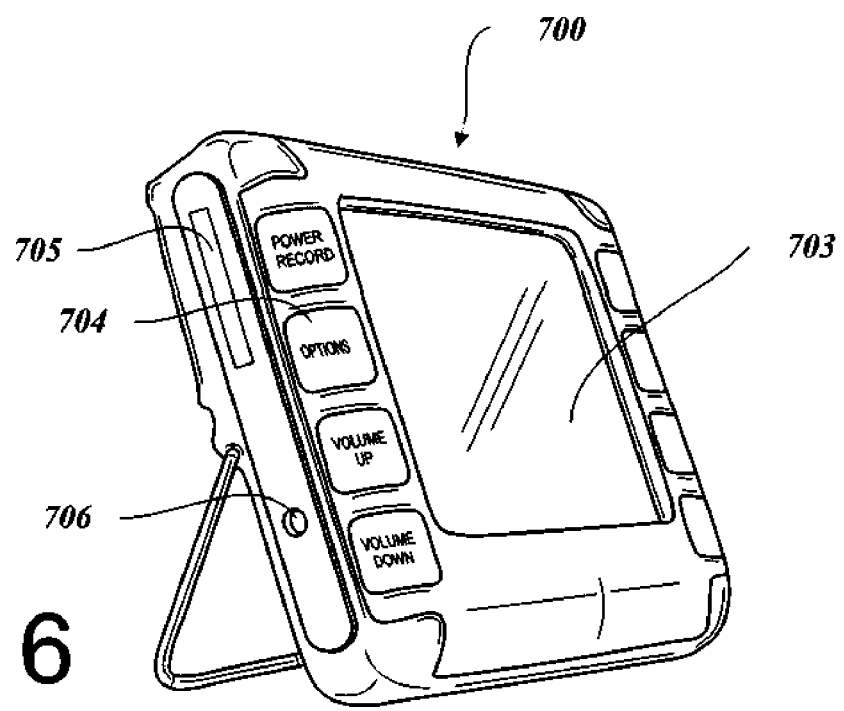
FIG. 6 illustrates an exemplary video storage device for use in conjunction with the video capture assembly provided herein.
Figure 7:
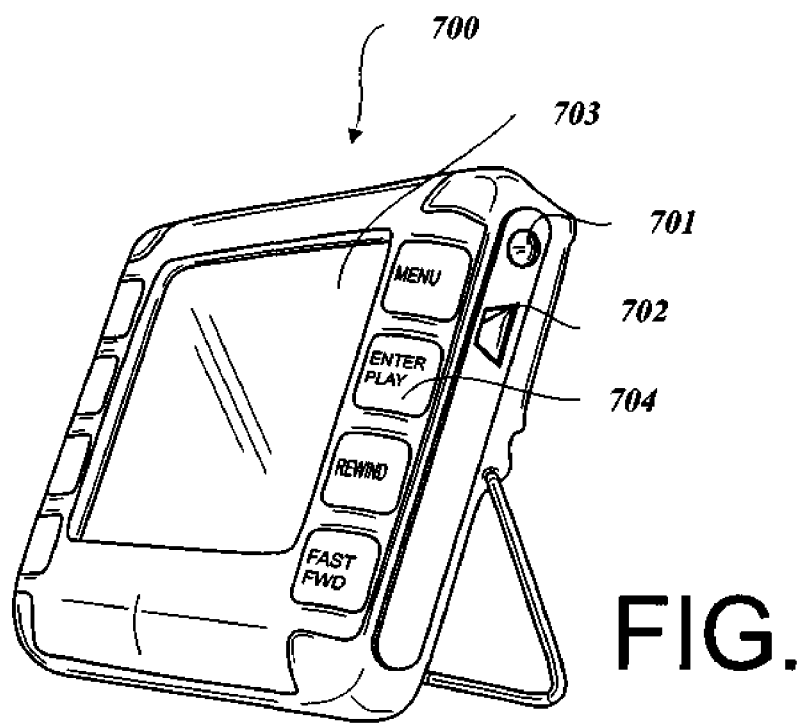
FIG. 7 illustrates another view of an exemplary video storage device for use in conjunction with the video capture assembly provided herein.

FIGS. 6-7 illustrate views of an exemplary video storage device 700 for use in conjunction with the video capture assembly provided herein. A video storage device such as 700 is removably attachable to the device interface 520 from FIG. 5. The video storage device 700 sits atop the shock absorbent padding 500, and the lid closes over the video storage device 700 such that motion of the video storage device 700 relative to the case 110 is prevented. For example, when closing the lid causes the device 700 to depress the absorbent padding 500 somewhat, motion of the device 700 within the case 110 is inhibited.

In general, device 700 may comprise elements such as a battery (not shown), such as a Li-Ion or Li-Poly type battery, a display 703, various controls such as 704, memory card interface 705, battery recharge/alternative power port 706, computer system interface such as USB interface 702, and device interface insertion point 701. Device 700 is, in general, an electronic device with processor and memory as described in connection with FIG. 8. As such, device 700 is configurable in a wide variety of ways and with any of a huge variety of features as will be appreciated by those of skill in electronics. Some advantageous features that may be incorporated into device 700 are set forth here, recognizing that such features may be selectively combined with other features in many specific implementations.

With reference to FIG. 8, an exemplary computing device 800 suitable for use in connection with the invention is broadly described. In its most basic configuration, device 800 typically includes a processing unit 802 and memory 803. Depending on the exact configuration and type of computing device, memory 803 may be volatile (such as RAM), non-volatile (such as ROM, flash memory, etc.) or some combination of the two. Additionally, device 800 may have mass storage (removable 804 and/or non-removable 805) such as magnetic or optical disks, tape, or flash memory. Because device 800 advantageously stores a maximal amount of video data received from image sensors, mass storage should be maximized as device size and cost effectiveness permits.

Similarly, device 800 may be connectable to input devices 807 such as a keyboard and mouse, vehicle on-board computers and user controls. Output devices 806 connectable to the device may include for example audio output means, vehicle on-board computers and user controls, large screen displays that present a GUI as a graphical aid accessing the functions of the computing device 800, and for example displays such as a Heads Up Display (HUD) that can project an image onto a helmet visor 102. Other aspects of device 800 may include communication connections 808 to other devices, computers, networks, servers, etc. using either wired or wireless media.

Features of the device 800 may be implemented in hardware and software. Software features are implemented using computer-executable instructions, such as program modules, being executed by device hardware. Generally, program modules include routines, programs, objects, components, data structures, etc. that perform particular tasks or implement particular abstract data types.

Referring back to FIG. 7, in one advantageous configuration, device 700 may comprise a plurality of video input channels and may be configured to store simultaneously received video input in an appropriate format for replaying such video, such as a split screen format. For example, information indicating a time that simultaneously received video frames are captured is kept, so that such video feeds remain appropriately correlated in time. Simultaneously received signals may be automatically and dynamically formatted into in a split screen format, so that on replay all simultaneously captured video is displayed simultaneously in different portions of the display. Also, device 700 may be adapted to periodically capture still images from one or more image sensors. These stills may be similarly stored with appropriate data to correlate those captured at the same time, and may be stored for split screen replay.

In another embodiment, device 700 may comprise at least one data acquisition channel. In this embodiment, device 700 may be further configured to overlay data acquired via said data acquisition channel onto simultaneously received video input. For example, where a device 700 is interfaced with a vehicle computer, the device 700 can capture vehicle speed such as Miles Per Hour (MPH), Rotations Per Minute (RPM), braking data, temperature, and acceleration data, and overlay a display of such data on the video showing the views of from any image sensor(s) coupled to the device 700. Where a device is interfaced with a firearm, upon receipt of a wireless signal from trigger sensor or barrel transducer coupled to a firearm, the device may overlay on corresponding video a graphic indication that shots were fired. A device could also receive data from many other instruments, such as, for example, a heart rate monitor.

Device 700 may be configured to begin and stop recording based on input from a remote switch, such as 105 from FIG. 1. Such switch may be coupled to device 700 via a wired or wireless connection. In one embodiment, the remote switch is a grip switch held in a hand of a user of the video capture assembly. In another embodiment, the remote switch is a bite switch placed in the mouth of the user of the video capture assembly. In these embodiments, the remote switch sends a signal to the video recording device with a first squeeze of the switch, causing the video recording device to begin recording. A subsequent squeeze of the switch sends a signal that causes the video recording device to stop recording.

In another embodiment, device 700 may be equipped with face recognition software that will identify a person and sound an alarm upon such recognition. The alarm can be, for example, an audible noise, or a vibration. For example, the helmet camera described below may be equipped with complimentary equipment that vibrates upon appropriate signal from the video recording device 700. In embodiments providing this feature, the user is preferably provided with appropriate device interface to program duration and intensity of the alarm, and the sensitivity of the face recognition software.

Also, in one embodiment, the face recognition software can operate to start and/or stop image recording by the video recording device. For example, face recognition software can analyze an incoming video stream for faces on file—or for any face at all. When a face is recognized, the face recognition software initiates video recording by the device. A timer may be used to record for a predetermined time interval after the recording device begins recording. For example, recording may stop after 5 minutes.

Figure 9:
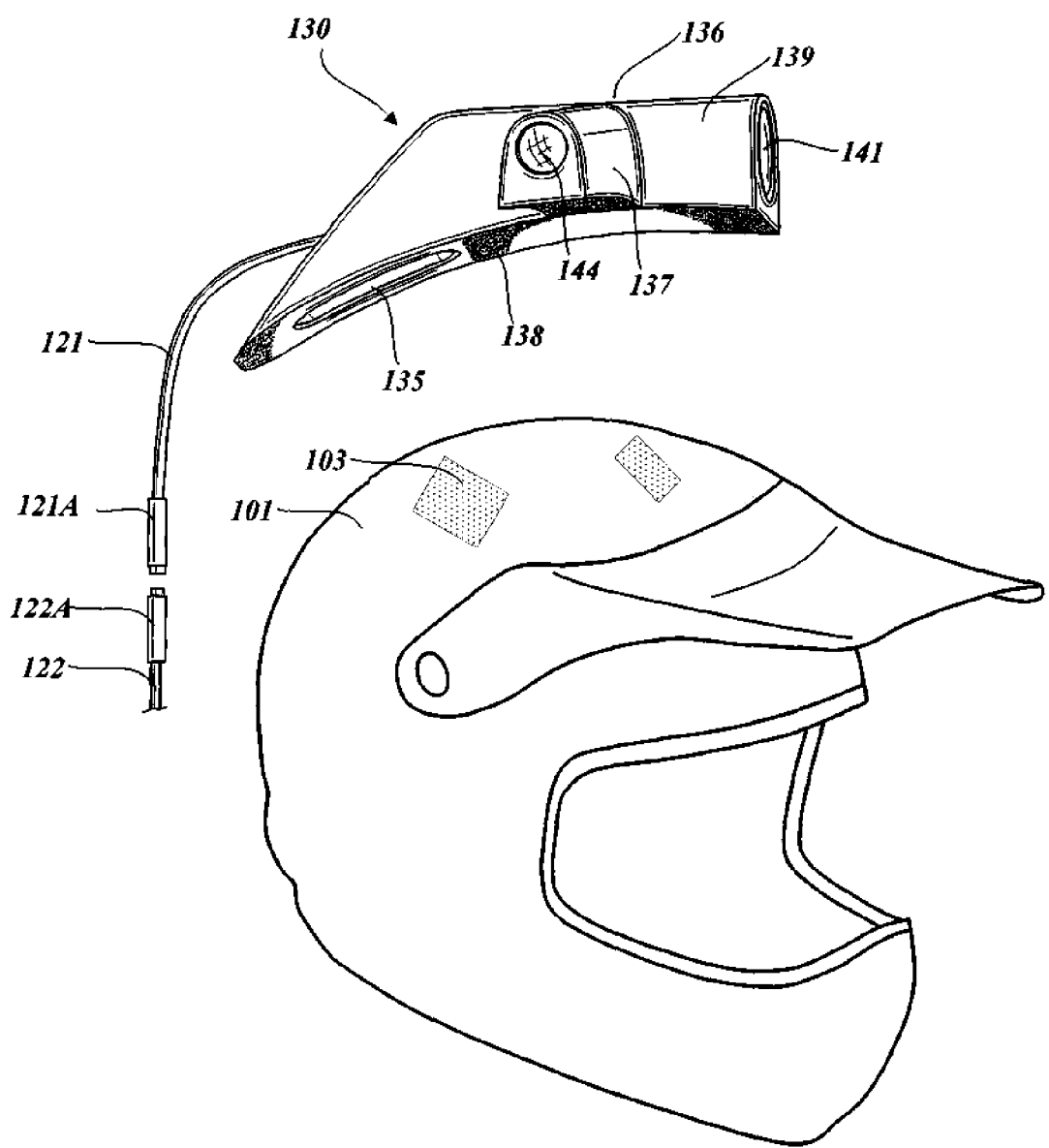
FIG. 9 illustrates an exemplary helmet and helmet camera for use in conjunction with the video capture assembly provided herein.

FIG. 9 illustrates exemplary image sensors 141, 144 for use in the video capture assembly. In the illustrated embodiment, the image sensors 141, 144 are disposed in a helmet camera 130. Helmet camera 130 comprises image sensors 141, 144 and a protective housing 136. Note that only two of four image sensors can be seen in this view. While the illustrated embodiment comprises four image sensors oriented north, south, east and west (where north is defined as the forward direction of the user wearing the helmet camera) it will be appreciated that numerous other configurations are possible. For example, the helmet camera 130 could be configured with one image sensor oriented north, or in a two image sensor arrangement with sensors oriented north and south, or northeast and northwest, or in a three image sensor arrangement with image sensors oriented northeast, northwest, and south, or north, southwest, and southeast. In another arrangement, two image sensors could both be oriented north, for bifocal image data collection and the corresponding option to produce three dimensional images.

In the illustrated four image sensor embodiment, the protective housing 136 comprises a longitudinal housing 139 and a transverse housing 137. The longitudinal housing 139 may comprise cavities for image sensors oriented north and south, while the transverse housing 137 may comprise cavities for image sensors oriented east and west. The protective housing 136 as a whole, or one or the other of the longitudinal housing 139 or transverse housing 137 individually, may have a surface such as bottom surface 138 that is contoured to fit atop a helmet 101.

The illustrated bottom surface 138 is speckled to represent an interlocking material that may adhere to the bottom surface to serve as an attaching means. In this embodiment, interlocking material on bottom surface 138 would be removably attachable to a complimentary interlocking material 103 adhered to the surface of the host helmet 101. Other exemplary attaching means for securing the protective housing 136 atop a helmet 101 or other host may include, by way of example but not limitation, a threaded post, a permanent glue, one or more snaps, one or more tie-downs that travel up and over the protective housing 136, and/or a "plug in" arrangement where one or more flexible members disposed, e.g. on the protective housing 136 bend upon insertion into receptacles in the helmet 101, then snap into place when fully inserted.

A wide variety of helmets are available today, and many are designed for specific activities such as motorcycling, skydiving, mountain biking, skiing or snowboarding, and so on. It will be appreciated that helmet camera 130 could be configured to sit atop any helmet type, as well as on other hosts such as the roof of a car, the fuselage of an aircraft, SCUBA gear, the human head without a helmet or the head of an animal used in sporting activities such as a horse, dog, or bull. In certain scenarios it may be advantageous to design the helmet camera 130 to be multi purpose, by allowing it to be easily attachable to multiple different hosts. For example, in the case of racing enthusiasts, the helmet camera might be designed to be quickly and securely attachable to both a motorcycle helmet and the roof of a car. Additionally, an image sensor for use with the video capture assembly provided here may be deployed without the helmet camera, and may be instead deployed in some other housing as necessary.

The protective housing 136 may further comprise a complimentary equipment cavity 135, and any number of other cavities as necessary to accommodate complimentary equipment. Complimentary equipment cavity 135 comprises a cavity within the protective housing 136. Complimentary equipment cavity 135 may have its opening on the bottom surface 138, as illustrated, or on any other surface of the protective housing 136. Alternatively, where complimentary equipment is built into the protective housing 136 at the time of manufacture, complimentary equipment cavity 135 may be a strictly internal cavity without a user-accessible opening. Other means of allowing for integration of complimentary equipment comprise, for example, any means of attaching complimentary equipment to the outer surfaces of protective housing 136. Exemplary complimentary equipment that may be advantageously disposed within complimentary equipment cavity 135 or otherwise integrated with the helmet camera 130 is discussed in greater detail below.

In one embodiment, the protective housing 136 may comprise appropriate apparatus for rotating the various image sensors with respect to the helmet. Rotation of the image sensors may be used, for example, to incrementally or continuously capture a panoramic view. Such footage may be manipulated by software on the image recording device, or later edited on a larger more powerful computing device. An advantageous rotation mechanism preferably allows for a full 360 degree rotation without disrupting image capture by the image sensors. The image sensors can for example make a continuous rotation while generating video data. Various algorithms can be used to later organize video data as necessary. For example, if an aircraft is approaching from one direction, the aircraft would be seen alternately by various image sensors as the aircraft comes into view of a particular sensor, and would approaching closer and closer on each viewing. The captured video could be stored and displayed on a per-image sensor basis as captured, or for example in a mode that filters for a particular object of interest. Also, real time adjustments are possible wherein when an object of interest is identified, the helmet camera ceases its continuous rotation and instead allows a single sensor to "lock on" to the identified object of interest.

Less than 360 degree rotation may be acceptable to achieve full information about the user's surroundings. Appropriate stitching software can stitch various received images together as necessary. It will be appreciated that to simplify cabling and so forth it may be preferable to implement wireless communications between the image sensors and image recording device as necessary.

Image sensors 141, 144 may comprise any device that converts a visual image to an electric signal. For example, a variety of such devices are used in today's digital cameras. Very generally, a Charge-Coupled Device (CCD) arrangement may be used in one exemplary embodiment. In another embodiment, a Complementary Metal Oxide Semiconductor (CMOS) type arrangement may be used. Any image sensor now in use or later developed may be appropriate, depending on the embodiment and its desired cost, quality, and size specifications. For example, image sensors in use today include the bayer sensor, the Foveon X3 sensor, and the 3CCD sensor. While the 3CCD sensor is generally more expensive than a single CCD sensor, it also captures a better quality image so may be appropriate where image quality is worth the corresponding expense. It will be appreciated that the selected image sensor may further include a sensor housing and appropriate lens, electrical circuitry and communication wiring.

In one embodiment, an image sensor may be waterproofed, as may all cables and connections leading to the video recording device. Such embodiments are adapted for underwater activities or activities otherwise requiring water resistance such as surfing, waterskiing, and ice climbing.

The various image sensors 141, 144 and any complimentary equipment such as a microphone may be communicatively coupled to a multi channel flexible cable 121 emerging from the protective housing 136. In single image sensor embodiments the cable need not be multi channel. The cable 121 is adapted to carry image signals from image sensors 141, 144 to the video recording device 700.

There are a variety of cables suitable for carrying video data available today, any of which may be used. For example, many audio/video cables, fiber optic cables, coaxial cables, and so forth are capable of carrying multiple channels. In multi-channel cable embodiments, a cable may be multi channel by virtue of having separate "wires" or other means for transmitting electrical signals, each dedicated to a unique channel (i.e. each wire communicatively coupled with an image sensor). In another embodiment, a cable may be multi channel by using multiplexing apparatus. For example, signals from each image sensor can feed into a multiplexer, which transmits such signals over single wire in cable 121, combining them in such a way as to be separatable by for example a video recording or replay device at an opposite end of such cable 121.

In an alternative embodiment, image sensors may be coupled to a wireless transmitter for wireless transmission of video data. The wireless transmitter may be located, for example, in a complimentary equipment cavity of the protective housing. A wireless transmission protocol such as a BLU-TOOTH® protocol, Wireless USB, 802.11, or any other wireless protocol may be used to transmit data to an image recording device.

Image sensors 141, 144 may comprise either electronic or optical zoom apparatus. Also, image sensors 141, 144 may be configured to detect images in wavelength beyond the visible spectrum. For example, in one embodiment that may have utility for example in police and firefighting applications, one or more image sensors may detect infrared and or so-called "thermal imaging" images.

Image sensors 141, 144 may capture image stills or video, or both. The term "image" as used herein can be a still image or a video image. While in general video capture is the contemplated use of the video capture assembly, it will be appreciated that still image capture is also possible and could be advantageous in some scenarios. For example, to preserve battery life and reduce memory consumption, some embodiments may periodically capture still images from image sensors 141, 144 in lieu of video.

Cable 121 may terminate in a tension quick-release component 121A that engages with a complimentary tension quick-release component 122A attached to a further length of cable 122, which in turn may continue to an interface to a video recording or replay device. The tension quick-release component 121A provides safety and convenience, by allowing the user to easily disconnect the helmet camera 130 from other components. It also safeguards against cable breaking or stretching in the event that the cable is snagged for example by a tree branch as a user is downhill skiing. Tension quick-release components 121A and 122A may provide a plurality of male/female wire connections, e.g., one for each wire inside cable 121.

Figure 10:
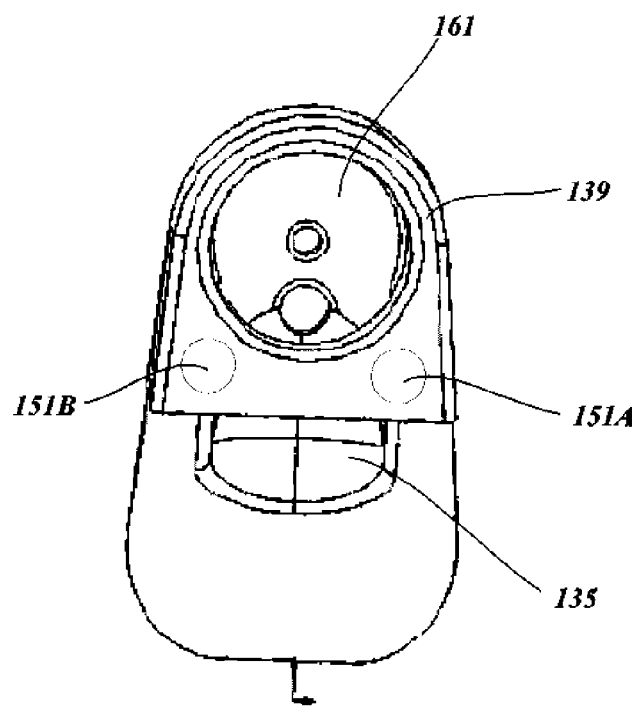
FIG. 10 illustrates an exemplary helmet camera protective housing for use in conjunction with the video capture assembly provided herein.
Figure 11:
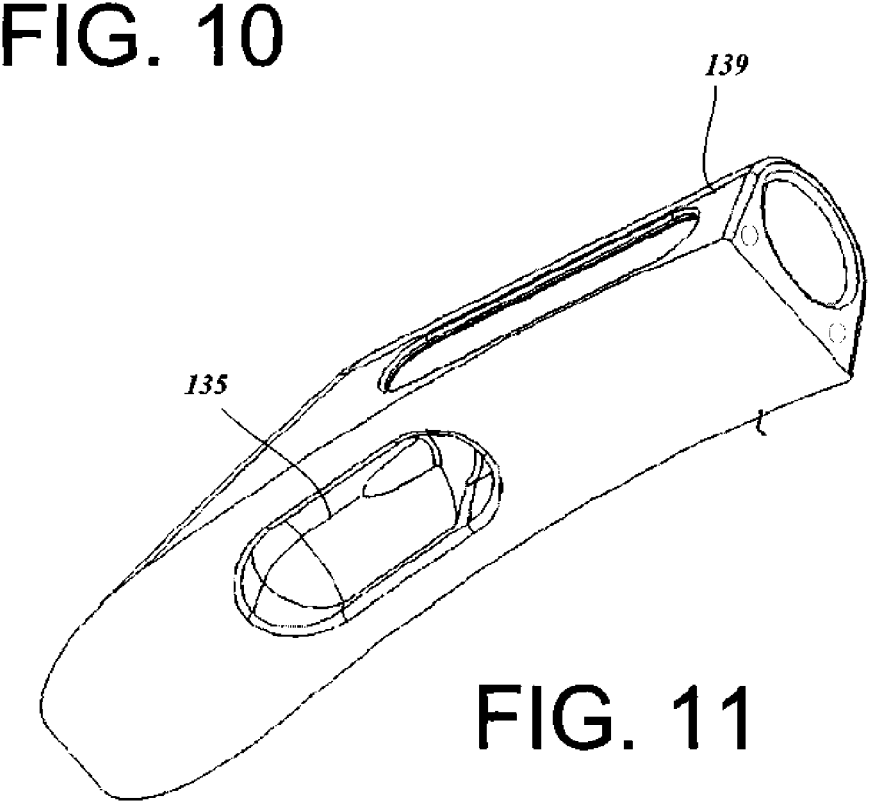
FIG. 11 illustrates another view of an exemplary helmet camera protective housing for use in conjunction with the video capture assembly provided herein.

FIGS. 10 and 11 illustrate views of a longitudinal helmet camera housing 139 as may be used in various embodiments. In FIG. 10, an image sensor cavity 161 for a north oriented image sensor is clearly shown. Image sensor cavity 161 may lead to a complimentary equipment cavity 135, which in this embodiment doubles as a point of insertion for inserting an image sensor into image sensor cavity 161. Complimentary equipment cavity 135 may further extend to 151A and 151B, for example when complimentary equipment requires an outlet on a north facing surface of the helmet camera.

Exemplary complimentary equipment that may be utilized in connection with the illustrated embodiment comprises, but is not limited to, a brake light and turn signals, a microphone, a laser pointer, an avalanche beacon, a Global Positioning System (GPS) locator, a radio signal communications apparatus, logo illumination, and/or a vibration or alarm mechanism for signaling the wearer of the helmet camera.

A brake light is preferably visible from the rear of the helmet camera. A brake light illuminates when the user brakes or otherwise slows down while wearing the helmet camera. In one embodiment, this is achieved without interfacing to a vehicle, by using an accelerometer. For example, an accelerometer may be also disposed within the complimentary equipment cavity, or may be communicatively coupled to brake light by way of cable 121. In another embodiment, the brake light interfaces with vehicle electronics, and illuminates in response to a signal from a vehicle. Such signal may be wireless, or may be received via cable 121, e.g. from a video record/replay device that is in turn communicatively coupled to onboard vehicle electronics. In a further embodiment, a brake light may instead be configured as a tail light, and remain continuously illuminated, or, e.g., continuously flashing, for enhanced visibility of the helmet camera.

Turn signals are also preferably disposed in rear-facing portions of the helmet camera housing. A left turn signal illuminates when the user turns left, and right turn signal illuminates when the user turns right. Turn signals can also be responsive to signals from an accelerometer. The accelerometer may have 2 axes, a longitudinal axis for use with a brake light and a transverse axis for use with turn signals. Also like the brake light, the turn signals may be responsive to signals from a vehicle or from user controls.

A microphone for use with the helmet camera can preferably collect audio data on multiple audio channels and be coupled to appropriate frequency filtering apparatus. Radio signal communications apparatus may communicate according to any of the variety of wireless communications protocols in use today or later developed. For example, Wi-Fi as defined by the 802.11a, 802.11b, 802.11g specifications, wireless Universal Serial Bus (USB), Bluetooth®, and Wide Area Network (Cellular) communications are presently available wireless communications protocols. To generate appropriate wireless signals, a signal generator and antenna may be disposed inside the helmet camera. Microphone and radio signal communications apparatus can be coupled with an audio output means such as a speaker, allowing the user to wirelessly communicate with others in range of the wireless signal.

Logo illumination is used for brand promotion and also to enhance the aesthetic of the helmet camera. Logo illumination can be accomplished for example using low power illumination means such as Light Emitting Diodes (LEDs) disposed in a cavity such as 151B. A logo is then carved out of the opaque housing sidewall, and replaced with a translucent material which allows light from the LEDS to filter through.

Laser pointer, avalanche beacon, and Global Positioning System (GPS) locator are each examples of complimentary equipment that may be loaded into a complimentary equipment cavity by a user as necessary for the user's individual activity, or may be installed at time of manufacture to produce a helmet camera that is especially advantageous for a particular activity. For example, an avalanche beacon may be especially useful for mountaineering applications such as rock and ice climbing. A laser pointer could be substituted with a headlight that provides, e.g., cyclists and/or SCUBA divers with additional safety and visibility.

In light of the diverse environments that may be built according to the general framework of provided in this specification, the systems and methods provided herein cannot be construed as limited in any way to a particular architecture. Instead, the present invention should not be limited to any single embodiment, but rather should be construed in breadth and scope in accordance with the appended claims.

The invention claimed is:

1. A personal video storage assembly, comprising:
    a waterproof protective case configured to hold a video storage device, without being configured to hold a video camera device, said waterproof protective case comprising a bottom portion and a lid, said waterproof protective case having dimensions appropriate for carrying said waterproof protective case in one hand;
    a shock absorbent padding disposed in said bottom portion, said shock absorbent padding shaped to fit a surface of said video storage device and to inhibit said video storage device from lateral motion inside said waterproof protective case;
    a waterproof layer disposed between an outer wall of said bottom portion and said shock absorbent padding, said lid engaging with said waterproof layer to form a watertight seal;
    a plurality of submersible connectors protruding outside said waterproof protective case from said bottom potion, said plurality of submersible connectors coupled to a device interface disposed inside said waterproof protective case, wherein at least a first submersible connector of said plurality of submersible connectors is configured as a video connector and at least a second submersible connector of said plurality of submersible connectors is configured as a non-video connector, wherein said shock absorbent padding covers said plurality of submersible connectors, and wherein said device interface extends above said shock absorbent padding;
    a pressure release valve in said waterproof protective case, said pressure release valve configured to release air from inside said waterproof protective case without allowing water into said waterproof protective case; and
    said device interface being removably attachable to said video storage device, wherein said shock absorbent padding is configured for having said video storage device sits atop said shock absorbent padding, and said lid closes over said video storage device such that motion of said waterproof protective case relative to said video storage device is inhibited.

2. The personal video storage assembly of claim 1, wherein said second connector comprises an audio input.

3. The personal video storage assembly of claim 1, further comprising a Heads Up Display (HUD) that is attachable to said video storage device.

4. The personal video storage assembly of claim 1, further comprising an image sensor connecting to said first submersible connector via a flexible cable.

5. The personal video storage assembly of claim 1, wherein said video storage device comprises a computer readable medium with computer executable instructions for processing data received from a vehicle.

6. The personal video storage assembly of claim 1, wherein said video storage device comprises a computer readable medium with computer executable instructions for processing data received from a firearm.

7. The personal video storage assembly of claim 1, wherein said video storage device comprises a plurality of video input channels and is configured to store simultaneously received video input in a split screen format.

8. The personal video storage assembly of claim 1, wherein said video storage device comprises at least one data acquisition channel, and is configured to overlay data acquired via said data acquisition channel onto simultaneously received video input.

9. The personal video storage assembly of claim 1, further comprising a remote switch for activating video recording by said video storage device.

10. The personal video storage assembly of claim 9, wherein said remote switch comprises a grip switch.

11. The personal video storage assembly of claim 1, wherein said video storage device comprises a computer readable medium with computer executable instructions for face recognition.

12. A personal video storage assembly, comprising:
    A waterproof protective case configured to hold a multi channel video storage device, without being configured to hold a video camera device, said waterproof protective case having dimensions appropriate for carrying said waterproof protective case in one hand;
    a shock absorbent padding disposed in said waterproof protective case, said shock absorbent padding shaped to fit a surface of said video storage device and to inhibit said multi channel video storage device from lateral motion inside said waterproof protective case;
a waterproof layer disposed between a wall of said waterproof protective case and said shock absorbent padding, said waterproof layer configured to form a watertight seal;
a plurality of connectors protruding outside said waterproof protective case, said plurality of connectors coupled to a device interface disposed inside said waterproof protective case, wherein at least a first connector of said plurality of connectors is configured as a video connector and at least a second connector of said plurality of connectors is configured as a non-video connector;
a pressure release valve in said waterproof protective case, said pressure release valve configured to release air from inside said waterproof protective case without allowing water into said waterproof protective case; and
said device interface being removably attachable to said multi channel video storage device, and disposed within said waterproof protective case such that upon closing said waterproof protective case, motion of said video storage device relative to said waterproof protective case is inhibited, wherein said multi channel video storage device is configured to store simultaneously received video input.

13. The personal video storage assembly of claim 12, further comprising a flexible cable adapted for attaching to said first connector, said cable being further adapted to carry multiple video channels.

14. The personal video storage assembly of claim 13, said cable comprising a tension quick-release.

15. The personal video storage assembly of claim 13, further comprising two or more image sensors coupled to said cable.

16. The personal video storage assembly of claim 15, wherein said two or more image sensors are disposed within a housing adapted to attach to a helmet.

17. The personal video storage assembly of claim 12, wherein said second connector comprises an audio input.

18. The personal video storage assembly of claim 12, wherein said video storage device comprises at least one data acquisition channel, and is configured to overlay data acquired via said data acquisition channel onto simultaneously received video input.

19. The personal video storage assembly of claim 12, further comprising a remote switch for activating video recording by said video storage device.

20. The personal video storage assembly of claim 12, wherein said multi channel video storage device stores said simultaneously received video input in a split screen format.

21. A personal video storage assembly, comprising:
a waterproof protective case configured to hold a video storage device, without being configured to hold a video camera device;
a shock absorbent padding disposed in said waterproof protective case, said shock absorbent padding shaped to fit a surface of said video storage device and to inhibit said video storage device from lateral motion inside said waterproof protective case;
a waterproof layer disposed between a wall of said waterproof protective case and said shock absorbent padding, said waterproof layer configured to form a watertight seal;
a plurality of connectors protruding outside said waterproof protective case, said plurality of connectors coupled to a device interface disposed inside said waterproof protective case, wherein at least a first connector of said plurality of connectors is configured as a video connector and at least a second connector of said plurality of connectors is configured as a non-video connector;
a pressure release valve in said waterproof protective case, said pressure release valve configured to release air from inside said waterproof protective case without allowing water into said waterproof protective case; and
said device interface being removably attachable to said video storage device, and disposed within said waterproof protective case such that upon closing said waterproof protective case, motion of said video storage device relative to said waterproof protective case is inhibited, wherein said video storage device comprises at least one data acquisition channel, and is configured to overlay data acquired via said data acquisition channel onto simultaneously received video input.

22. The personal video storage assembly of claim 21, further comprising a flexible cable adapted for attaching to said video input connector.

23. The personal video storage assembly of claim 22, further comprising at least one image sensor coupled to said cable.

24. The personal video storage assembly of claim 21, further comprising a remote switch for activating video recording by said video storage device.

* * * * *